United States Patent
Lee

(10) Patent No.: US 6,549,234 B1
(45) Date of Patent: Apr. 15, 2003

(54) PIXEL STRUCTURE OF ACTIVE PIXEL SENSOR (APS) WITH ELECTRONIC SHUTTER FUNCTION

(75) Inventor: Sung-Min Lee, Seoul (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/170,105

(22) Filed: Oct. 13, 1998

(30) Foreign Application Priority Data

Jun. 9, 1998 (KR) .............................................. 98-21259

(51) Int. Cl.[7] ................................................ H04N 3/14
(52) U.S. Cl. ........................ 348/302; 348/308; 348/297
(58) Field of Search ................................ 348/241, 308, 348/294, 302, 303, 296, 304, 297; 250/208.1

(56) References Cited

U.S. PATENT DOCUMENTS

| | | | |
|---|---|---|---|
| 5,471,515 A | | 11/1995 | Fossum et al. ................ 377/60 |
| 5,680,151 A | * | 10/1997 | Grimm et al. ............... 345/120 |
| 5,812,191 A | * | 9/1998 | Orava et al. ................ 348/308 |
| 5,877,715 A | * | 3/1999 | Gowda et al. ............... 348/294 |
| 5,892,541 A | * | 4/1999 | Merrill ........................ 348/304 |
| 6,037,979 A | * | 3/2000 | Yonemoto ................... 348/308 |
| 6,115,066 A | * | 9/2000 | Gowda et al. ............... 348/308 |
| 6,175,383 B1 | * | 1/2001 | Yadid-Pecht et al. ....... 348/302 |
| 6,344,877 B1 | * | 2/2002 | Gowda et al. ........... 250/208.1 |

FOREIGN PATENT DOCUMENTS

| JP | 59-030376 | 2/1984 |
|---|---|---|
| JP | 60-022879 | 2/1985 |
| JP | 61-214870 | 9/1986 |
| JP | 63-078679 | 4/1988 |
| JP | 63-127679 | 5/1988 |
| JP | 02-171088 | 7/1990 |
| JP | 04-373272 | 12/1992 |
| JP | 05-075931 | 3/1993 |
| JP | 05-130519 | 5/1993 |
| JP | 05-227489 | 9/1993 |

* cited by examiner

*Primary Examiner*—Wendy R. Garber
*Assistant Examiner*—Lin Ye
(74) *Attorney, Agent, or Firm*—Morgan, Lewis & Bockius LLP

(57) ABSTRACT

A pixel structure with an electronic shutter function using an active pixel sensor (APS) capable of overcoming a disadvantage of conventional pixel structures using the active pixel sensor that reset the pixels not in pixel units but in line units, and thus an electronic shutter cannot be provided, includes a plurality of pixels arrayed in a lattice pattern, a row selection decoder outputting a row selection signal to each pixel, a first line counter counting a number of lines of the pixels selected by the row selection decoder, a line reset selection decoder outputting a line reset signal to each pixel, a second line counter counting a number of lines of the pixel selected by the line reset selection decoder, a column reset selection decoder outputting a column reset signal to each pixel, a first pixel counter counting a number of the pixels selected by the column reset selection decoder, a pixel reading unit reading the pixels in pixel units, and a second pixel counter counting a number of the pixels which are read by the pixel reading unit.

3 Claims, 4 Drawing Sheets

PIXEL STRUCTURE OF ACTIVE PIXEL SENSOR (APS) WITH ELECTRONIC SHUTTER FUNCTION

BACKGROUND OF THE INVENTION

1. Field of the Invention

The present invention is directed to a pixel (picture element) structure of an active pixel sensor (APS), and in particular to a pixel structure of an active pixel sensor (APS) which can carry out a reset operation by pixel units by providing the pixels with a double reset structure to implement an electronic shutter function.

2. Description of the Background Art

Among pixel structures employing CMOS sensors, the most successful pixel structure in processing noise is a pixel structure using an active pixel sensor (APS). A remarkable characteristic of the pixel structure using the active pixel sensor (APS) is that each pixel amplifies the image information accumulated in a photo-diode, namely, the charge caused by photoelectrons, before converting it into a voltage.

FIG. 1 is a block diagram illustrating a conventional pixel structure using an active pixel sensor (APS). As shown in FIG. 1, the conventional pixel structure includes: a plurality of pixels P11–Pmn arrayed in a lattice pattern of rows and columns; a row selection decoder 1 selectively outputting a row selection signal ROW to the plurality of pixels P11–Pmn; a first line counter LC1 counting a number of lines of the pixels selected by the row selection decoder 1; a reset selection decoder 2 selectively outputting a reset signal RS to each row of pixels; a second line counter LC2 counting a number of lines of the pixels selected by the reset selection decoder 2; a column reading unit 3 reading image information stored in the pixels; and a pixel counter PC1 counting a number of the pixels read by the column reading unit 3.

FIG. 2 is a circuit diagram illustrating a pixel PXji located in a predetermined position. As shown in FIG. 2, the pixel PXji includes: a first NMOS transistor NM21 with its gate receiving the reset signal RS and its drain receiving a power supply voltage VDD; a photo-diode PD with its anode connected to ground and its cathode connected to the source of the first NMOS transistor NM21; a second NMOS transistor NM22 with its gate commonly connected to the source of the first NMOS transistor NM21 and the cathode of the photo-diode PD, and with its drain receiving the power supply voltage VDD; and a third NMOS transistor NM23 with its gate receiving the row selection signal ROW, its drain connected to the source of the second NMOS transistor NM22, and its source outputting an output signal OUT.

The operation of the above-described conventional pixel structure using the active pixel sensor (APS) will now be explained.

First, the reset signal RS outputted from the reset selection decoder 2 is inputted to the gate of the first NMOS transistor NM21 of a selected pixel PXji which is located in a predetermined position, and thus the first NMOS transistor NM21 is turned on. The first NMOS transistor NM21 discharges photoelectrons generated by incident light, thereby draining any internal electrical charge from the photo-diode PD. In this case, the reset operation is carried out in line units.

Then, when the photoelectrons are accumulated in the photo-diode PD by the incident light for a predetermined photosensing time, the voltage produced by accumulated photoelectrons is amplified by the second NMOS transistor NM22.

At this time, the row selection signal ROW outputted from the row selection decoder 1 is applied to the gate of the third NMOS transistor NM23, and thus the third NMOS transistor NM23 is turned on. Accordingly, the output signal OUT is outputted from the source of the third NMOS transistor NM23 to the column reading unit 3.

The output signal OUT represents the output image information of the selected pixel PXji.

Herein, the term "information" refers to the second image property, typically the light intensity, that is, the photonic energy incident on the photo-diode in each pixel sensor, which causes the accumulation of electrical charge (i.e., electron-hole pairs generated in a semiconductor junction) and in terms of an induced voltage potential due to photoelectrons producing a current.

However, the conventional pixel structure of the active pixel sensor (APS) has a disadvantage in that, as the reset operation is carried out not in pixel units but in line units, an electronic shutter function cannot be utilized.

SUMMARY OF THE INVENTION

Accordingly, it is an object of the present invention to provide a pixel structure using an active pixel sensor (APS) which can provide an electronic shutter function by carrying out a reset operation by pixel units.

In order to achieve the above-described object of the present invention, there is provided a pixel structure of an active pixel sensor (APS) with an electronic shutter function, including: a plurality of pixel sensors arrayed in rows and columns; a row selection decoder outputting a row selection signal ROW to each pixel sensor; a first line counter counting a number of lines of the pixels selected by the row selection decoder; a line reset selection decoder outputting a line reset signal to each pixel sensor; a second line counter counting a number of lines of the pixel selected by the line reset selection decoder; a column reset selection decoder outputting a column reset signal to each pixel sensor; a first pixel counter counting a number of the pixels selected by the column reset selection decoder; a column reading unit reading image information stored in the pixels; and a second pixel counter counting a number of the pixels which are read by the column reading unit.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

Figure 1:
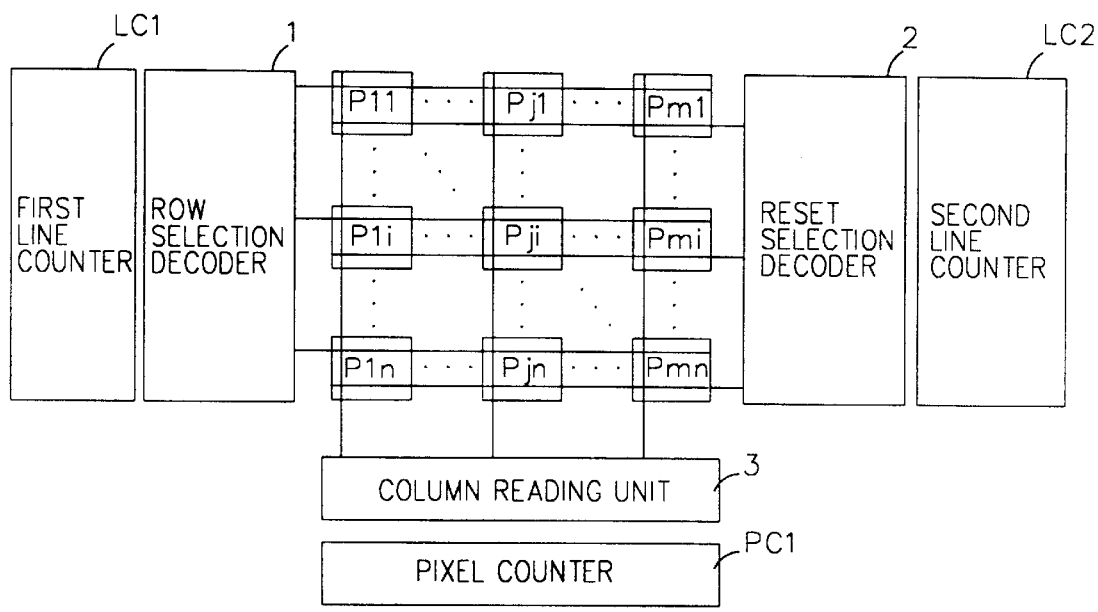
FIG. 1 is a block diagram illustrating a conventional pixel structure of an image sensor using an active pixel sensor (APS)
Figure 2:
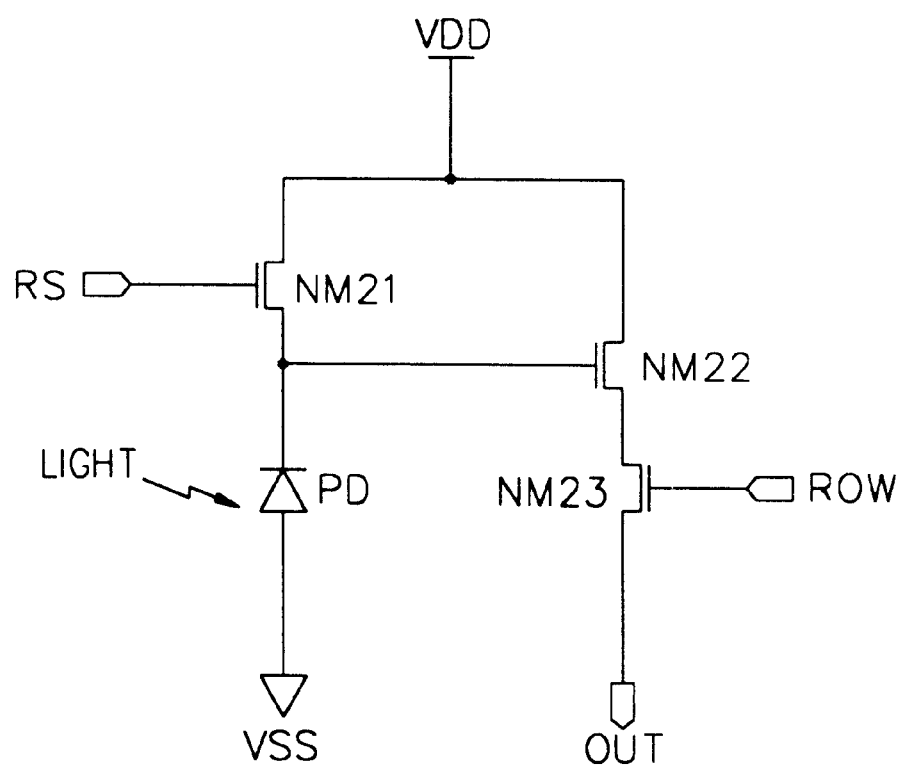
FIG. 2 is a circuit diagram illustrating a general pixel in the conventional pixel structure using the active pixel sensor (APS) in FIG. 1.
Figure 3:
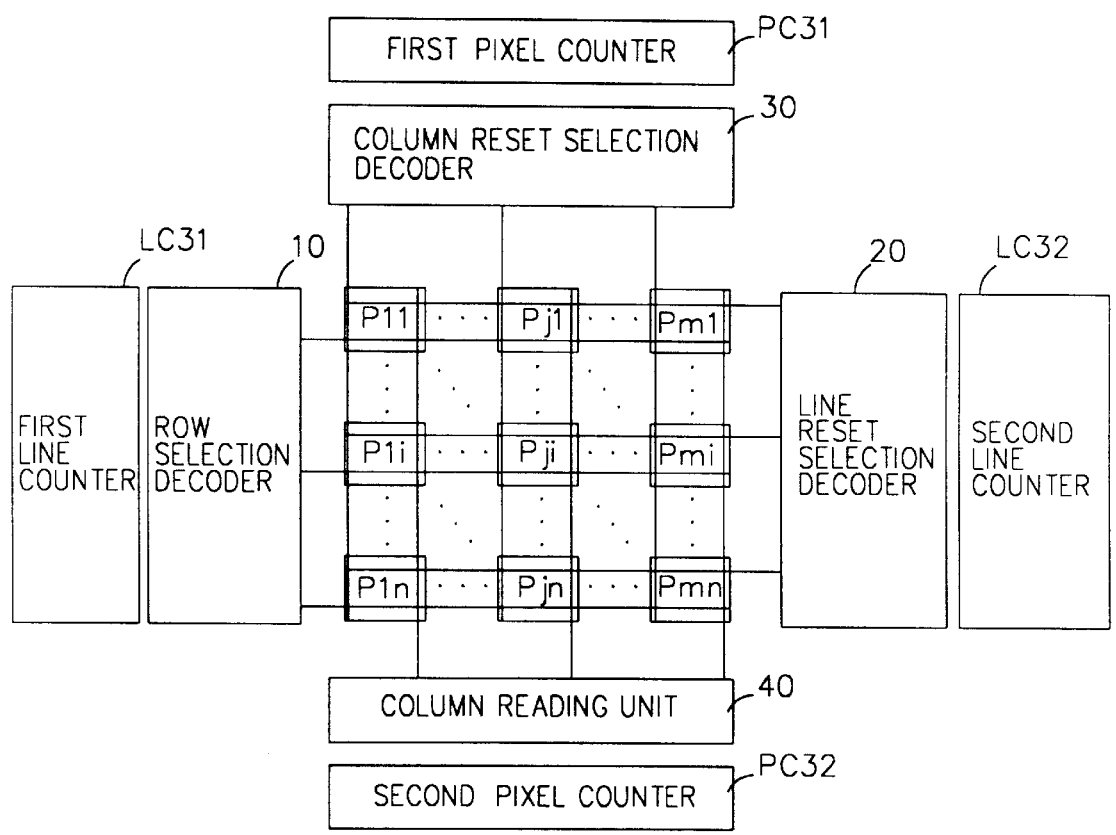
FIG. 3 is a block diagram illustrating a pixel structure of an image sensor with an electronic shutter function using an active pixel sensor (APS) in accordance with the present invention.

FIG. 3 is a block diagram illustrating a pixel sensor array structure with an electronic shutter function using an active pixel sensor (APS) in accordance with the present invention. As shown in FIG. 3, the pixel sensor array structure with the electronic shutter function using the active pixel sensor includes: a plurality of pixels PX11–PXmn which are arrayed in a lattice pattern of rows and columns and sense image information; a row selection decoder 10 outputting a row selection signal ROW to output the image information, i.e., charge, stored in each pixel PX11–PXmn; a first line counter LC31 counting a number of lines of the pixel selected by the row selection decoder 10; a line reset selection decoder 20 outputting a line reset signal LRS to reset each pixel PX11–PXmn in line units; a second line counter LC32 counting a number of lines selected by the line reset selection decoder 20; a column reset selection decoder 30 outputting a column reset signal CRS to reset each pixel PX11–PXmn in column units; a first pixel counter PC31 counting the number of the pixels selected by the column reset selection decoder 30; a column reading unit 40 reading the image information, i.e., charge, stored in the pixels; and a second pixel counter PC32 counting the number of pixels which are read by the column reading unit 40.

The operation of the above-described pixel sensor array structure with the electronic shutter function using the active pixel sensor (APS) in accordance with the present invention will now be described.

First, it is presumed that an electrical charge accumulating time of the pixel PXji located in a predetermined position is T(ji). In the case that the electronic shutter is not operated, the value of T(ji) is identical to a field or frame constituting time. Each pixel has an identical photoelectron accumulating time. However, in regard to a time for starting to accumulate the photoelectrons, there is a time difference generated as much as a position difference among each pixel. That is, the time difference corresponding to one clock period is generated between a predetermined pixel PXji and a pixel in a next succeeding row.

When the electronic shutter is operated, the electric charge accumulating time T(ji) of the pixel PXji located in a predetermined position is the time after the reset operation of the pixel PXji before an output of the charge generated by the photoelectrons accumulated in the photo-diode PD, namely, from the time when the pixel is reset to the time when the output signal OUT is outputted by application of the row selection signal ROW.

The electrical charge accumulating time T is represented by the following equation;

$$\Delta T = T(\text{line}) \times n + T(\text{column}) \times m$$

Here, 'n' denotes the number of the rows, and 'm' denotes the number of the columns, respectively.

It is presumed that the electrical charge accumulating time of the pixel PXji located in a predetermined position is T(ji). In order to read the image information, i.e., charge, accumulated in the pixel PXji, namely, charge caused by the photoelectrons, the photo-diode PD should be reset and initialized at least before the electron accumulating time T(ji). Therefore, the certain electron accumulating time T is provided in pixel units, and thus the electronic shutter function can be employed.

In regard to a charge transmitting time of the plurality of pixels PX11–PXmn, a time difference which corresponds to the position of the pixels, namely, the number of the rows (n) and the number of the columns (m), is generated among the pixels PX11–PXmn. Therefore, the time difference between a first transmitted pixel charge and a last transmitted pixel charge in a frame corresponds to one frame or one field. Therefore, an initialization can be carried out in pixel units by controlling the reset operation in row and column units, thereby discriminately providing an electronic shutter timing to each pixel PX11–PXmn.

Figure 4:
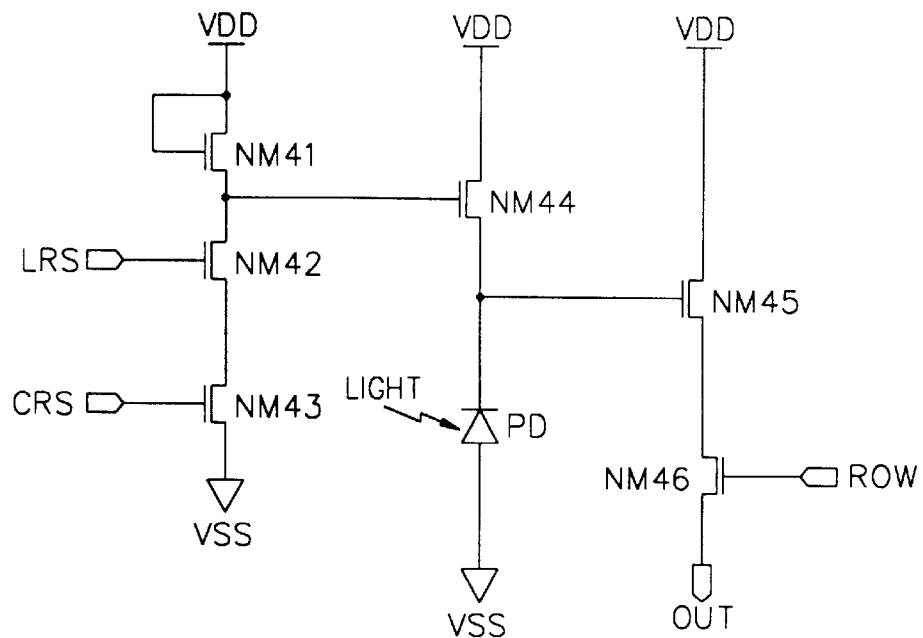
FIG. 4 is a circuit diagram illustrating a pixel in the pixel sensor structure with the electronic shutter function using the active pixel sensor (APS) in FIG. 3 in accordance with a first preferred embodiment of the present invention.

FIG. 4 is a circuit diagram illustrating a pixel PXji located in a predetermined position in accordance with a first preferred embodiment of the present invention. As shown in FIG. 4, the pixel includes: a first NMOS transistor NM41 with its gate and drain connected to each other and receiving a power voltage supply VDD; a second NMOS transistor NM42 with its gate receiving the line reset signal LRS and its drain connected to the source of the first NMOS transistor NM41; a third NMOS transistor NM43 with its gate receiving the column reset signal CRS, its drain connected to a source of the second NMOS transistor NM42, and its source connected to a ground; a fourth NMOS transistor NM44 with its gate connected to the source of the first NMOS transistor NM41 and the drain of the second NMOS transistor NM42 at the same time, and its drain receiving the power supply voltage VDD; a photo-diode PD with its anode connected to a ground voltage VSS and its cathode connected to the source of the fourth NMOS transistor NM44; a fifth NMOS transistor NM5 with its gate connected commonly to the source of the fourth NMOS transistor NM4 and to cathode of the photo-diode PD, and with its drain receiving the power voltage VDD; and a sixth NMOS transistor NM46 with its gate receiving the row selection signal ROW, its drain connected to the source of the fifth NMOS transistor NM45, and its source outputting an output signal OUT.

The operation of the above-described pixel PXji located in a predetermined position in the pixel array structure with the electronic shutter function using the active pixel sensor (APS) in accordance with the first preferred embodiment of the present invention will now be described.

When the line reset signal LRS is inputted to the gate of the second NMOS transistor NM42 and the column reset signal CRS is inputted to the gate of the third NMOS transistor NM43 at the same time, the second and third NMOS transistors NM42, NM43 are both turned on, and thus the charge due to photoelectrons accumulated in the photo-diode PD is discharged.

Then, in case the voltage produced due to photoelectrons accumulated in the photo-diode PD by the light incident thereon is amplified by the fifth NMOS transistor NM45 for a predetermined photosensitive time, the row selection signal ROW is inputted to the gate of the sixth NMOS transistor NM46, and thus the sixth NMOS transistor NM46 is turned on. At this time, the output signal OUT is outputted from the source of the sixth NMOS transistor NM46.

Figure 5:
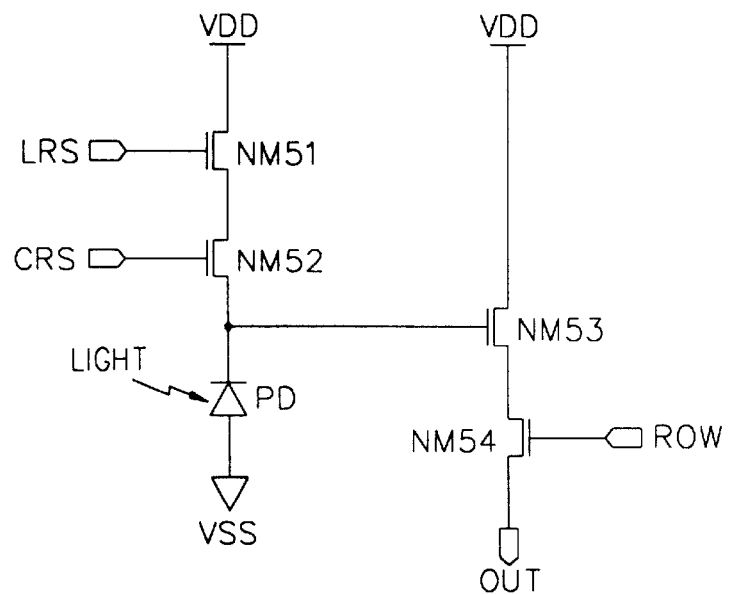
FIG. 5 is a circuit diagram illustrating a pixel in the pixel sensor structure with the electronic shutter function using the active pixel sensor (APS) in FIG. 3 in accordance with a second preferred embodiment of the present invention.

FIG. 5 is a circuit diagram illustrating a pixel sensor PXji located in a predetermined position in a pixel sensor structure with an electron shutter function using an active pixel sensor (APS) in accordance with a second preferred embodiment of the present invention. As shown therein, the pixel sensor includes: a first NMOS transistor NM51 with its gate receiving the line reset signal LRS and its drain receiving the power supply voltage VDD; a second NMOS transistor NM52 with its gate receiving the column reset signal CRS and its drain connected to the source of the first NMOS transistor NM51; a photo-diode PD with its anode connected to ground voltage VSS and with its cathode connected to the source of the second NMOS transistor NM52; a third NMOS transistor NM53 with its gate commonly connected to the source of the second NMOS transistor NM52 and to the cathode of the photo-diode PD, and with its drain receiving the power supply voltage VDD; and a fourth NMOS transistor NM54 with its gate receiving the row selection signal ROW, its drain connected to the source of the third NMOS transistor NM53, and with its source outputting the output signal OUT.

The operation of the above-described pixel sensor PXji located in a predetermined position in the pixel sensor array structure with the electronic shutter function using the active pixel sensor (APS) in accordance with the second preferred embodiment of the present invention will now be described.

First, when the line reset signal LRS and the column reset signal CRS are respectively inputted to the gates of the first and second NMOS transistors NM51, NM52 at the same time, the first and second NMOS transistors NM51, NM52 are both turned on, and thus the charge due to the photo-electrons accumulated in the photo-diode PD is discharged.

Then, in the case that the voltage produced due to photoelectrons accumulated in the photo-diode PD for a predetermined photosensitive time by the light incident thereon is amplified by the third NMOS transistor NM43, the row selection signal ROW is inputted to the gate of the NMOS transistor NM43, and thus the fourth NMOS transistor NM54 is turned on, and the output signal OUT is outputted from the source of the fourth NMOS transistor NM54.

Therefore, in accordance with the pixel sensor structure with the electronic shutter function using the active pixel sensor (APS) of the present invention, the pixels are reset in column and row units, and thus each pixel sensor is initialized when the reset signals for the column and row are simultaneously applied thereto. Accordingly, it makes it possible to carry out the initialization in pixel units, and thus the electronic shutter function appropriate for a movie camera can be provided.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A pixel structure with an electronic shutter function using an active pixel sensor (APS), comprising:

a plurality of pixel sensors arrayed in rows and columns;

a row selection decoder for outputting a row selection signal to each pixel sensor;

a first line counter for counting a number of lines of the pixel sensors selected by the row selection decoder;

a line reset selection decoder for outputting a line reset signal to each pixel sensor;

a second line counter for counting a number of lines of the pixel sensors selected by the line reset selection decoder;

a column reset selection decoder for outputting a column reset signal to each pixel;

a first pixel counter for counting a number of the pixel sensors selected by the column reset selection decoder;

a pixel reading means for reading the pixel sensors in pixel units; and a second pixel counter for counting a number of the pixel sensors which are read by the pixel reading means, wherein each pixel sensor comprises:

a first NMOS transistor with its gate and drain connected to each other and to receive a power supply voltage;

a second NMOS transistor with its gate connected to receive the line reset signal and its drain connected to a source of the first NMOS transistor;

a third NMOS transistor with its gate receiving the column reset signal, its drain connected to a source of the second NMOS transistor, and its source connected to receive a ground voltage;

a fourth NMOS transistor with its gate connected to the source of the first NMOS transistor and the drain of the second NMOS transistor, and with its drain connected to receive the power supply voltage;

a photo-diode with its anode connected to receive the ground voltage and its cathode connected to a source of the fourth NMOS transistor;

a fifth NMOS transistor with its gate connected to the source of the fourth NMOS transistor and the cathode of the photo-diode, and with its drain connected to receive the power supply voltage; and a sixth NMOS transistor with its gate connected to receive the row selection signal, its drain connected to a source of the fifth NMOS transistor, and with its source connected to output an output signal of the pixel sensor.

2. The pixel structure of claim 1, wherein each pixel sensor is reset before an electric charge accumulating time T(ji) from the time when an amount of electrical charge of the pixel sensor located in a predetermined position is read, whereby each pixel sensor has a predetermined electrical charge accumulating time.

3. The pixel structure of claim 2, wherein the electric charge accumulating time T(ji) is from the time when the pixel sensor is reset to the time when the output signal is outputted in response to the row selection signal.

* * * * *